(12) United States Patent
Peifer et al.

(10) Patent No.: US 7,914,193 B2
(45) Date of Patent: *Mar. 29, 2011

(54) LED LIGHT FIXTURE

(75) Inventors: Donald A. Peifer, Delancey, NY (US); Mark J. Walsh, Smithfield, RI (US)

(73) Assignee: Lunera Lighting, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/795,149

(22) Filed: Jun. 7, 2010

(65) Prior Publication Data

US 2010/0277910 A1    Nov. 4, 2010

Related U.S. Application Data

(62) Division of application No. 12/032,026, filed on Feb. 15, 2008, now Pat. No. 7,766,536.

(51) Int. Cl.
*F21S 4/00* (2006.01)
*F21S 8/06* (2006.01)

(52) U.S. Cl. ......... 362/612; 362/633; 362/634; 362/404

(58) Field of Classification Search .................. 362/602, 362/612, 613, 632, 633, 634, 147, 148, 150, 362/404, 249.02, 249.05, 249.06

See application file for complete search history.

(56) References Cited

U.S. PATENT DOCUMENTS

| 277,164 | A | 5/1883 | Scrymgeour |
|---|---|---|---|
| D61,324 | S | 8/1922 | Ponon |
| 2,402,717 | A | 6/1946 | Winer |
| 2,717,955 | A | 9/1955 | McGinty |
| 3,017,999 | A | 1/1962 | Cano |
| 3,639,806 | A | 2/1972 | Requa |
| 4,041,630 | A | 8/1977 | Holbrook |
| 4,149,331 | A | 4/1979 | Prager |
| D263,319 | S | 3/1982 | Shuman |
| D266,890 | S | 11/1982 | Pfanstiehl |
| 4,451,875 | A | 5/1984 | Odle et al. |
| D275,970 | S | 10/1984 | Bowers |
| 4,542,449 | A | 9/1985 | Whitehead |

(Continued)

FOREIGN PATENT DOCUMENTS

WO    WO 2007/129419    11/2007

OTHER PUBLICATIONS

International Search Report, PCT/US2009/032798, Feb. 2, 2009, 3-pages.

(Continued)

*Primary Examiner* — Thomas M Sember
(74) *Attorney, Agent, or Firm* — Heslin Rothenberg Farley & Mesiti P.C.

(57) ABSTRACT

An LED light fixture system includes an LED module having a plurality of LEDs attached thereto and directed inwardly toward a secondary optic. The LED module is releasably attached to an interior surface of a peripheral frame. The frame includes an openable portion positioned to allow the LED module to be inserted or removed through an opening created when the openable portion is in an open position. The openable portion is movable from the open position to a closed position and provides an electrical connection between the LEDs attached to the LED module and a source of electrical current when the openable portion is in the closed position.

19 Claims, 21 Drawing Sheets

U.S. PATENT DOCUMENTS

| | | | |
|---|---|---|---|
| 4,573,766 A | 3/1986 | Bournay, Jr. et al. | |
| D291,030 S | 7/1987 | Butterfield | |
| 4,729,183 A | 3/1988 | Tarter et al. | |
| 4,794,714 A | 1/1989 | Weisgerber | |
| 4,831,754 A | 5/1989 | Tallent | |
| D312,262 S | 11/1990 | Allon | |
| D328,925 S | 8/1992 | Levin | |
| 5,155,669 A | 10/1992 | Yamuro | |
| 5,188,449 A * | 2/1993 | Davis et al. | 362/148 |
| D354,483 S | 1/1995 | Yamazaki | |
| 5,410,454 A * | 4/1995 | Murase et al. | 362/611 |
| D362,765 S | 10/1995 | Ruggieri | |
| 5,530,571 A | 6/1996 | Chen | |
| D393,001 S | 3/1998 | Mayo | |
| 5,729,310 A | 3/1998 | Horiuchi et al. | |
| 5,883,684 A | 3/1999 | Millikan et al. | |
| 5,915,857 A | 6/1999 | Gallagher | |
| 5,943,801 A | 8/1999 | Wilkinson | |
| 5,946,061 A | 8/1999 | Kurihara et al. | |
| 5,987,794 A | 11/1999 | Lavi et al. | |
| 6,042,243 A | 3/2000 | Grill et al. | |
| 6,161,939 A * | 12/2000 | Bansbach | 362/223 |
| 6,167,648 B1 | 1/2001 | Dimmick | 40/546 |
| 6,188,527 B1 | 2/2001 | Bohn | |
| 6,217,186 B1 * | 4/2001 | Fisher | 362/627 |
| D451,555 S | 12/2001 | Smith | |
| 6,371,637 B1 | 4/2002 | Atchinson et al. | |
| 6,507,377 B1 | 1/2003 | Jung | |
| 6,530,164 B2 * | 3/2003 | Gai | 40/546 |
| D476,818 S | 7/2003 | Stravitz | |
| 6,685,328 B1 | 2/2004 | Hanson et al. | |
| D491,608 S | 6/2004 | Strunk et al. | |
| 6,742,292 B1 | 6/2004 | Albano | |
| 6,762,806 B1 | 7/2004 | Matsuo et al. | |
| 6,919,937 B2 | 7/2005 | Kim et al. | |
| 6,932,495 B2 | 8/2005 | Sloan et al. | |
| 6,945,668 B1 * | 9/2005 | Orlov et al. | 362/225 |
| 6,961,102 B2 | 11/2005 | Kitada et al. | |
| 7,044,626 B2 * | 5/2006 | Randak | 362/604 |
| 7,135,034 B2 | 11/2006 | Friedman et al. | |
| 7,139,048 B2 | 11/2006 | Han et al. | |
| 7,152,999 B2 | 12/2006 | Lin | |
| 7,175,330 B1 | 2/2007 | Chen | |
| 7,201,511 B2 | 4/2007 | Moriyama et al. | |
| 7,206,038 B2 | 4/2007 | Choi et al. | |
| 7,217,012 B2 | 5/2007 | Southard et al. | |
| 7,220,040 B2 | 5/2007 | Lengyel et al. | |
| 7,253,444 B2 | 8/2007 | Ikeda | |
| 7,275,852 B2 | 10/2007 | Kim et al. | |
| 7,309,152 B2 | 12/2007 | Huang | |
| 7,314,652 B2 | 1/2008 | Hey et al. | |
| D565,515 S | 4/2008 | Chen | |
| D575,887 S | 8/2008 | Mukai | |
| D582,064 S | 12/2008 | Mukai | |
| 7,563,015 B2 * | 7/2009 | Tzung-Shiun | 362/633 |
| 2002/0030983 A1 | 3/2002 | Chou | 362/31 |
| 2003/0026100 A1 | 2/2003 | Wang | |
| 2003/0147008 A1 | 8/2003 | Liu | |
| 2003/0193803 A1 | 10/2003 | Lin | |
| 2004/0004827 A1 | 1/2004 | Guest | |
| 2004/0061814 A1 | 4/2004 | Kim et al. | |
| 2004/0223328 A1 | 11/2004 | Lee et al. | |
| 2005/0122739 A1 | 6/2005 | Huang et al. | |
| 2005/0157500 A1 | 7/2005 | Chen et al. | |
| 2005/0157517 A1 | 7/2005 | Nomura | |
| 2006/0109688 A1 | 5/2006 | Oosawa | |
| 2006/0193132 A1 | 8/2006 | Kim et al. | |
| 2006/0207145 A1 | 9/2006 | Kim et al. | |
| 2006/0214905 A1 | 9/2006 | Okazaki | |
| 2006/0221632 A1 | 10/2006 | Hsu | |
| 2006/0237735 A1 | 10/2006 | Naulin et al. | |
| 2006/0238670 A1 | 10/2006 | Fu et al. | |
| 2006/0285358 A1 | 12/2006 | Chen et al. | 362/613 |
| 2007/0064444 A1 | 3/2007 | Kim et al. | |
| 2007/0064445 A1 | 3/2007 | Hatanaka et al. | |
| 2007/0081342 A1 | 4/2007 | Szeto | |
| 2007/0081361 A1 | 4/2007 | Clary | |
| 2007/0127031 A1 | 6/2007 | Kang et al. | |
| 2007/0133193 A1 | 6/2007 | Kim | |
| 2007/0153545 A1 | 7/2007 | Lee | |
| 2007/0171670 A1 | 7/2007 | Zagar et al. | |
| 2007/0195551 A1 | 8/2007 | Shin | |
| 2007/0247851 A1 | 10/2007 | Villard | |
| 2007/0247870 A1 | 10/2007 | Sakai et al. | 362/612 |
| 2007/0247873 A1 | 10/2007 | Awai et al. | 362/618 |
| 2007/0258263 A1 | 11/2007 | Kim | |
| 2007/0297188 A1 | 12/2007 | Chu | |
| 2008/0121898 A1 | 5/2008 | Yin et al. | |

OTHER PUBLICATIONS

Donald A. Piefer, pending U.S. Appl. No. 12/576,008, filed Oct. 8, 2009 entitled "Semi-Direct Solid State Lighting Fixture and Distribution," 36-pages.

Donald A. Piefer, pending U.S. Appl. No. 12/572,587, filed Oct. 2, 2009 entitled "An Apparatus for Producing a Beverage," 43-pages.

The Lighting Research Center, Rensselaer Polytechnic Institute, "New York Energy Smart$^{SM}$ Small Lighting Commercial Lighting Program. Technical Guide for Effective, Energy-Efficient Lighting," 58-pages, Oct. 26, 2005.

Donald A. Peifer, pending U.S. Appl. No. 12/795,178, filed Jun. 7, 2010 entitled "LED Light Fixture," 34-pages.

TiLux Drop-Ceiling Tile Advertisement, manufactured by LED folio corporation, Riverdale, New Jersey, printout available online on Dec. 22, 2009, at http://midwestled.com/Tiluxbroc01.pdf, and New Products web page listing availability of TiLux Drop-Ceiling Tile, available from Midwest LED, Dearborn Heights, Michigan, printout available online from www.archive.org on Dec. 22, 2009, at http://web.archive.org/web/20070713222807/http://midwestled.com/new_products.asp, 9-pages, Jul. 2007.

* cited by examiner

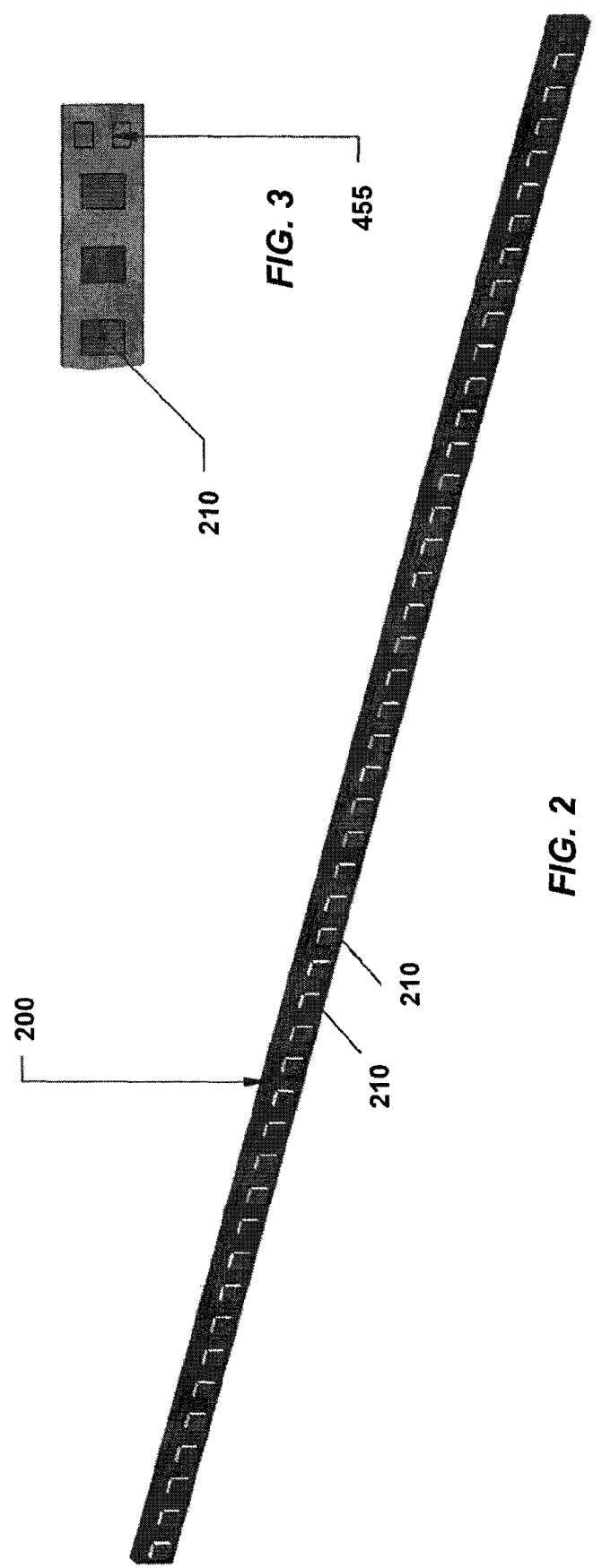

US 7,914,193 B2

LED LIGHT FIXTURE

CROSS-REFERENCE TO RELATED APPLICATION

This application is a divisional of co-pending U.S. patent application Ser. No. 12/032,026 filed on Feb. 15, 2008, entitled "LED Light Fixture," the entire subject matter of which is incorporated herein by reference.

TECHNICAL FIELD

This invention relates, in general, to lighting and, in particular, to an LED light fixture.

BACKGROUND ART

Standard incandescent lighting remains the light of choice for most applications today and yet it is relatively inefficient and fails more often relative to other lighting options. Fluorescent bulbs have been around for decades. They have been the indoor lamp of choice in many applications such as office lighting because of their efficiency compared to incandescent lighting. However, fluorescent lighting also has its detractors. The rising cost of energy and the desire to reduce energy use to minimize our "carbon footprint" has caused a look for other types of lighting.

The light produced by a light emitting diode (LED) is emitted from a solid object, i.e., a block of semiconductor—rather than from a vacuum or gas tube, as is the case in traditional incandescent light bulbs and fluorescent lamps. Unlike traditional lighting, an LED creates visible light with reduced heat generation or parasitic energy dissipation. In addition, its solid-state nature (i.e., from a solid object and not a vacuum or gas tube) provides for greater resistance to shock, vibration, and wear, thereby increasing its lifespan significantly.

An LED is usually a small area source, often with extra optics added to the chip that shapes its radiation pattern. LED's are often used as small indicator lights on electronic devices and increasingly in higher power applications such as flashlights and area lighting. Indication refers to the use of a light source that is to be viewed directly as a self-luminous object, such as in signs, signals, indicator lights on electronic equipment and back lighting units. Illumination refers to the use of a light source to view other objects by the light reflected from those objects, such as the general lighting found in most rooms, or task lighting found on many desks.

Advantages of LEDs include high durability (e.g., no filament or tube to break), long life span (e.g., LEDs can last approximately 100,000 hours), low power consumption, flexible application (e.g., the small size of LEDs can lead to unique lighting devices) and low heat generation.

Thus, a need exists for an light fixture which is energy efficient, long lasting and which may be used in multiple applications.

SUMMARY OF THE INVENTION

The present invention provides, in a first aspect, an LED light fixture system which includes an LED module having a plurality of LEDs attached thereto and directed inwardly toward a secondary optic. The LED module is releasably attached to an interior surface of a peripheral frame. The frame includes an openable portion positioned to allow the LED module to be inserted or removed through an opening created when said openable portion is in an open position. The openable portion is movable from the open position to a closed position and provides an electrical connection between the plurality of LEDs attached to the LED module and a source of electrical current when the openable portion is in the closed position.

The present invention provides, in a second aspect, an LED pendant light fixture which includes a plurality of LEDs attached to a peripheral frame and positioned to direct light in a first direction inwardly toward a secondary optic. A primary opening is bounded by outside surfaces of a front side of the frame and located in a second direction substantially orthogonal to the first direction relative to the secondary optic to provide direct lighting from the secondary optic through the primary opening toward an area below the frame when the frame is suspended from a support. A secondary opening is located opposite the primary opening on the frame and is located in a third direction substantially orthoganol to the first direction relative to the secondary optic to provide indirect lighting from the secondary optic through the secondary opening toward an area above the frame when the frame is suspended from a support.

The present invention provides, in a third aspect, an LED light fixture which includes a plurality of LEDs attached to a peripheral frame and positioned to direct light inwardly toward a secondary optic. An opening is bounded by outside surfaces of a front side of the frame to provide direct lighting from the secondary optic through the opening toward an area below the frame when the frame is suspended from a support. The frame includes a plurality of mounting holes to allow the frame to be mounted to the support. A decorative cover is releasably attachable to the frame to cover the mounting holes.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be apparent from the following detailed description of preferred embodiments taken in conjunction with the accompanying drawings in which:

FIG. 2 is a perspective view of an LED module for use in the system of FIG. 1;

FIG. 3 is a side elevational view of a portion of the LED module of FIG. 2;

DETAILED DESCRIPTION

In accordance with the principles of the present invention, LED light fixture systems and methods for using LEDs are provided.

Figure 1:
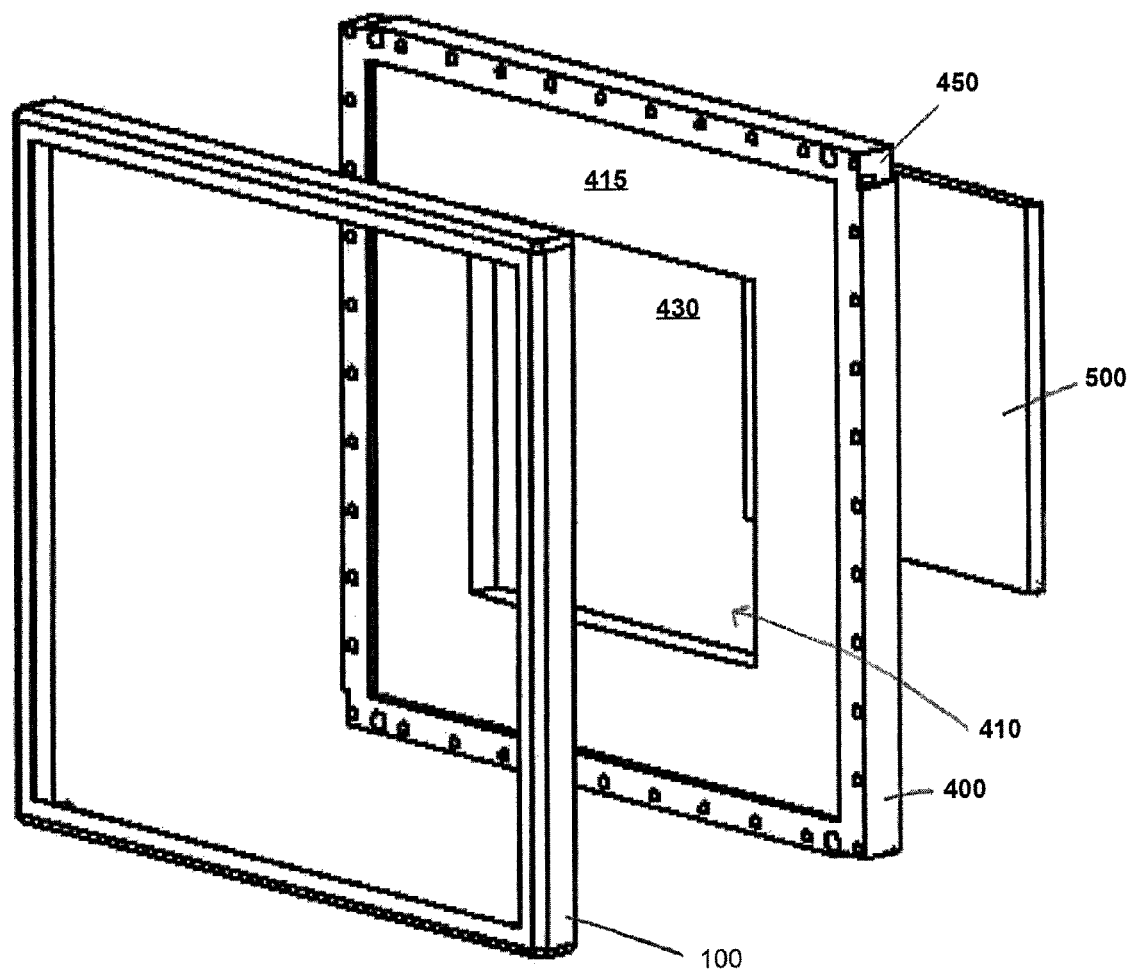
FIG. 1 is a perspective view of an LED light fixture system in accordance with the present invention.

In an exemplary embodiment depicted in FIG. 1, an LED luminaire or light fixture system 10 is provided which includes a frame 400 engageable with a trim or covering portion 100. Frame 400 may include a primary lighting opening 410 which is bounded by a front surface 415 of frame 400. A backplate or covering portion 500 may be releasably engageable with a back surface 425 (FIG. 10) of frame 400 such that a secondary lighting opening 430 may be revealed when covering portion 500 is not engaged with frame 400.

Figure 4:
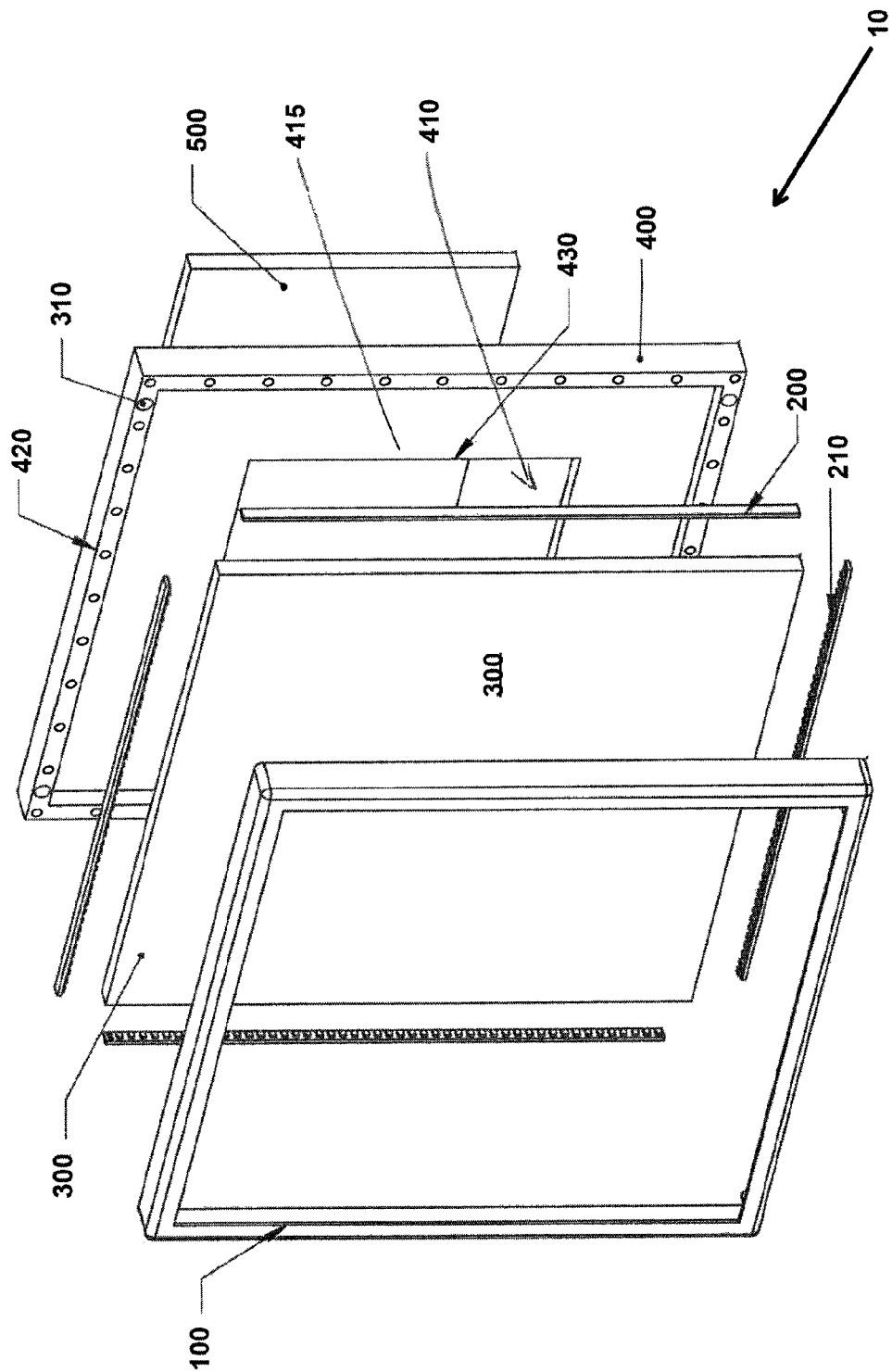
FIG. 4 is a perspective exploded view of the system of FIG. 1.
Figure 5:
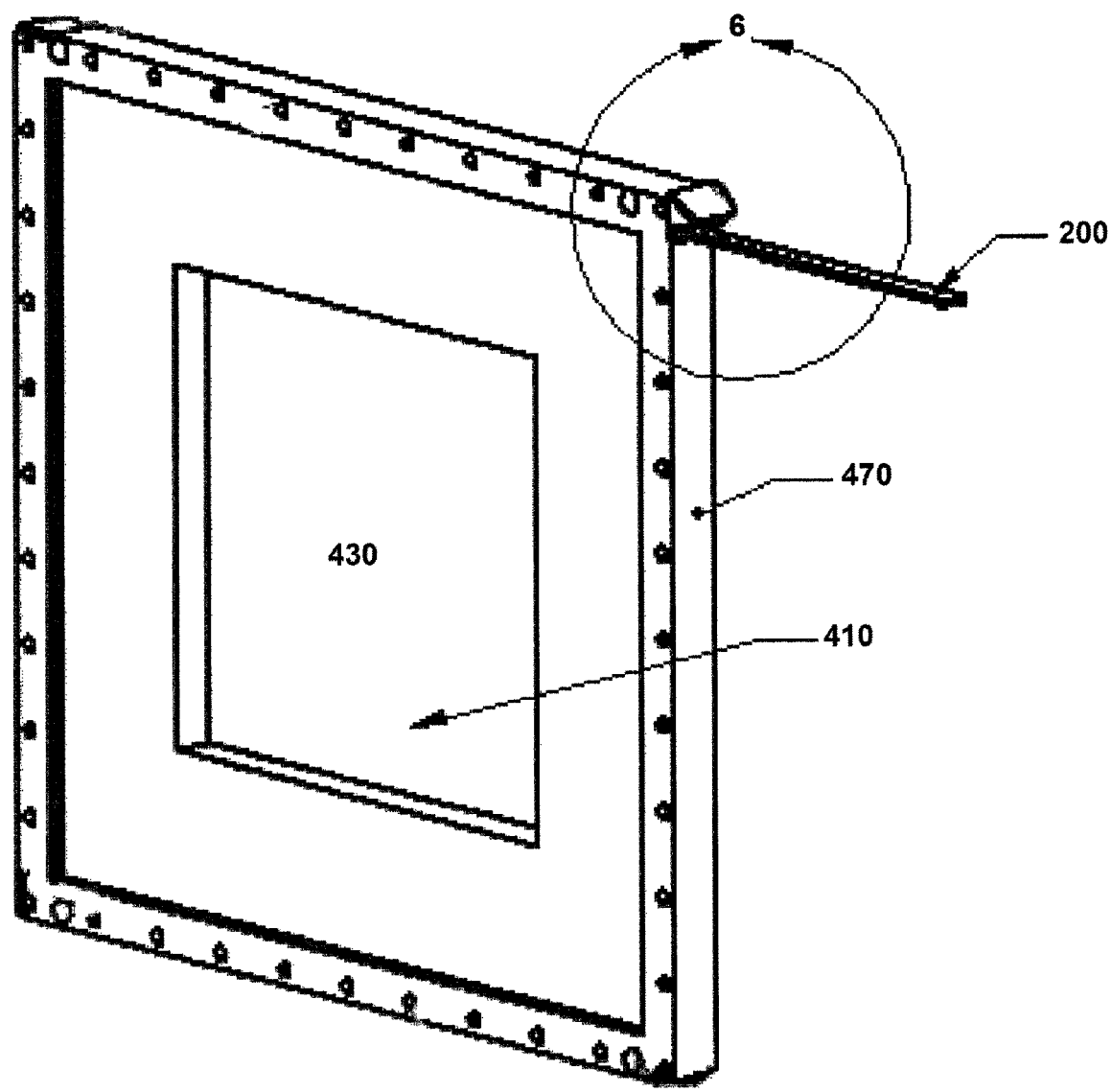
FIG. 5 is a perspective view of the system of claim 1 with the LED module of FIG. 2 extending therefrom.
Figure 6:
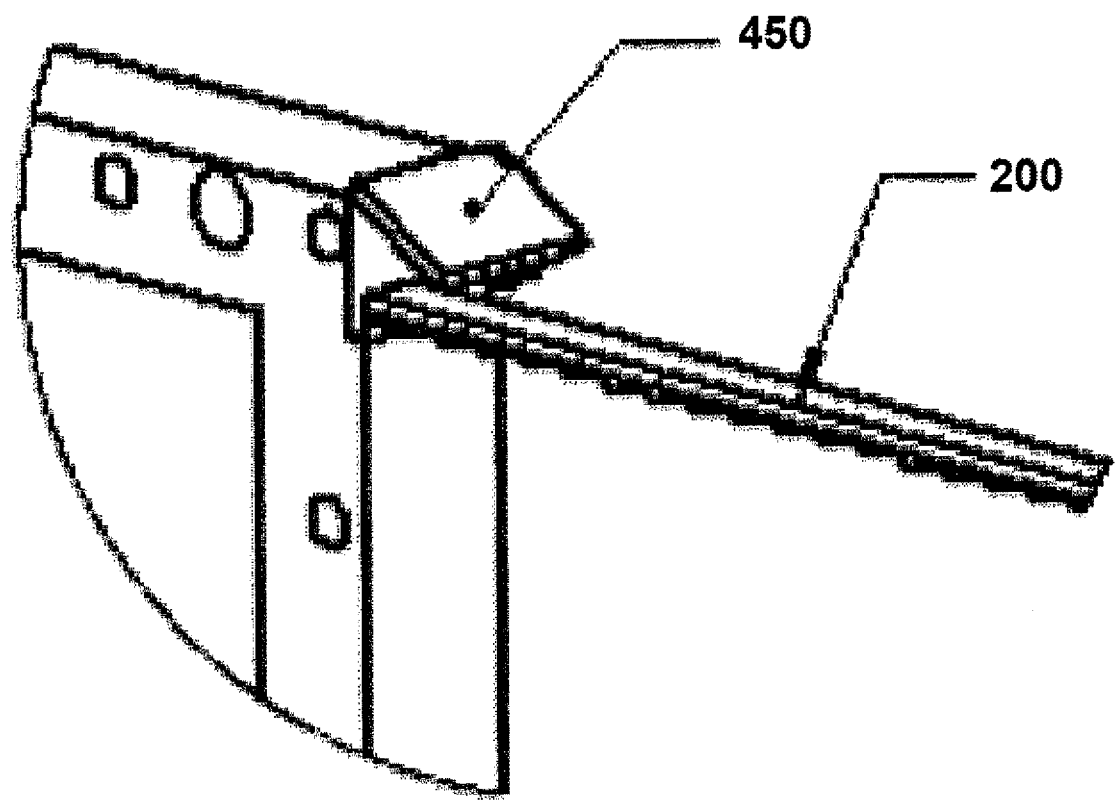
FIG. 6 is a perspective view of detail 6 of FIG. 5.
Figure 22:
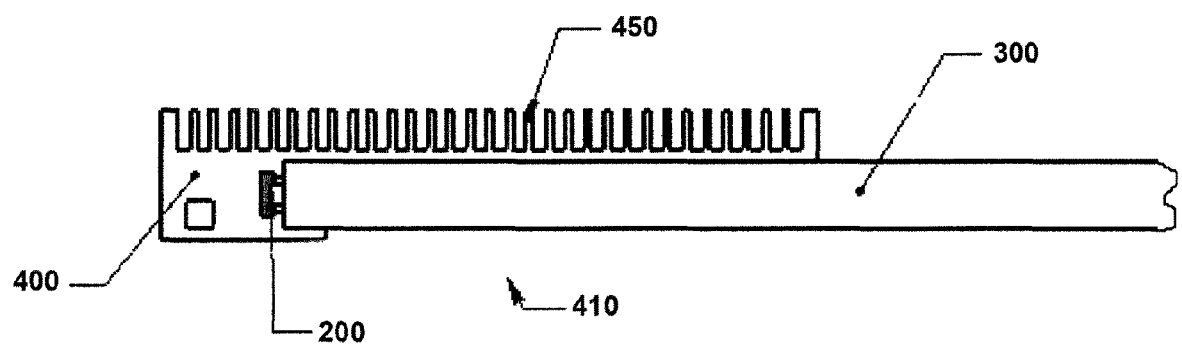
FIG. 22 is a side cross-sectional view of the system of FIG. 1.

An LED die or module 200 may include a plurality of light emitting diodes or LED's 210 as depicted in FIGS. 2, 3 and 22. Four LED modules 200 may be releasably connected to frame 400 such that the modules may direct light inwardly toward a secondary optic 300 as depicted in FIG. 4 which shows optic 300 and modules 200 exploded and separate from frame 400. As depicted in this figure, the modules and LEDs may substantially surround secondary optic 300 and may direct light inwardly toward an interior area of the optic through the outside edges of optic 300. Further, the LEDs may be substantially evenly linearly distributed on the LED modules as depicted in FIG. 2, for example. LED module 200 may be a standard LED strip module as used in the semiconductor industry.

Secondary optic 300 may be formed of a material (e.g., acrylic) configured to diffuse or soften light produced by the LEDs and to provide illumination through primary lighting opening 410 and/or secondary lighting opening 430. For example, system 10 including the LEDs and secondary optic are configured to provide illumination (i.e., use thereof to view other objects by the light reflected from those objects, such as the general lighting found in most rooms). In one example, a secondary optic could be made of acrylic glass (e.g., static free acrylic), such as PLEXIGLASS, which would provide for the diffusion of light therethrough and therefore through illumination openings (e.g., primary lighting opening 410 and/or secondary lighting opening 430) in a fixture. Further, the secondary optic could be made of various materials, such as glass or plastic, useful for diffusion and illumination.

As depicted in FIGS. 5 through 8, frame 400 may include an openable portion or door 450 to allow access to an interior 460 of frame 400. Door 450 may be releasably attachable or otherwise connectable to a side 470 of frame 400. For example, door 450 may be connected to a hinge (not shown) which may also be connected to side 470. Door 450 may also be held in closed position by a screw, or other fastener releasably engagable with side 470.

Figure 8:
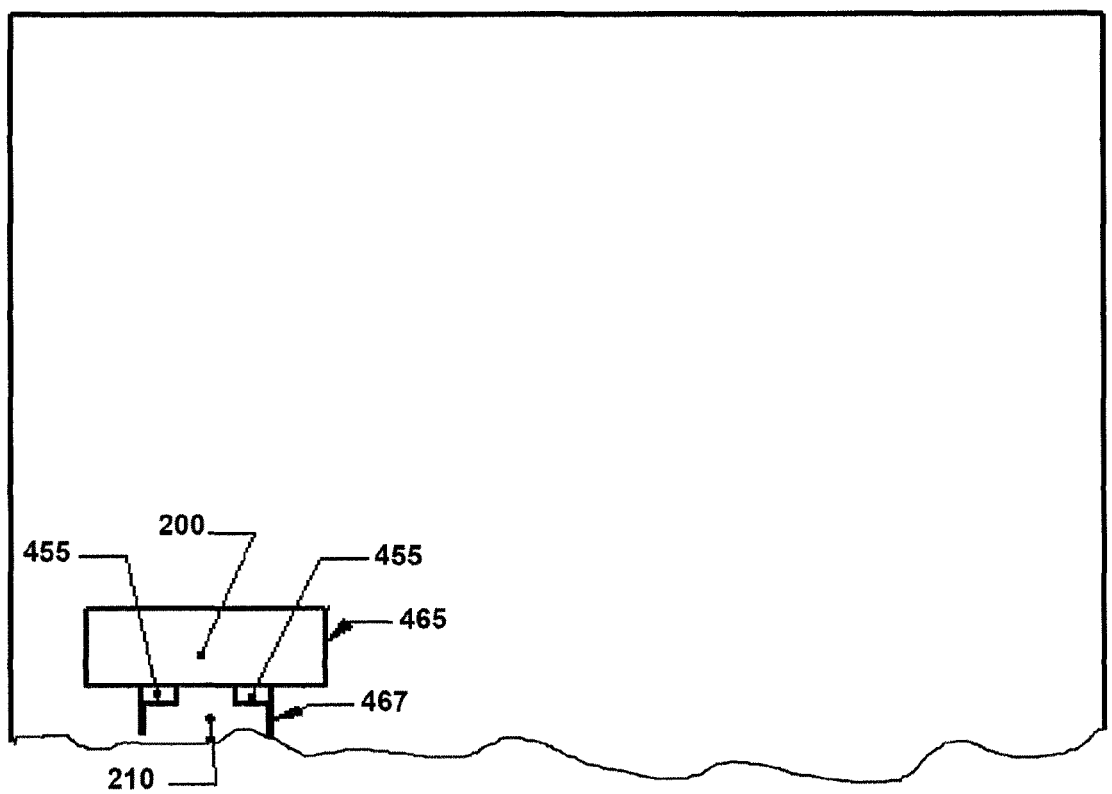
FIG. 8 is a side elevational view of detail 6 of FIG. 5.
Figure 9:
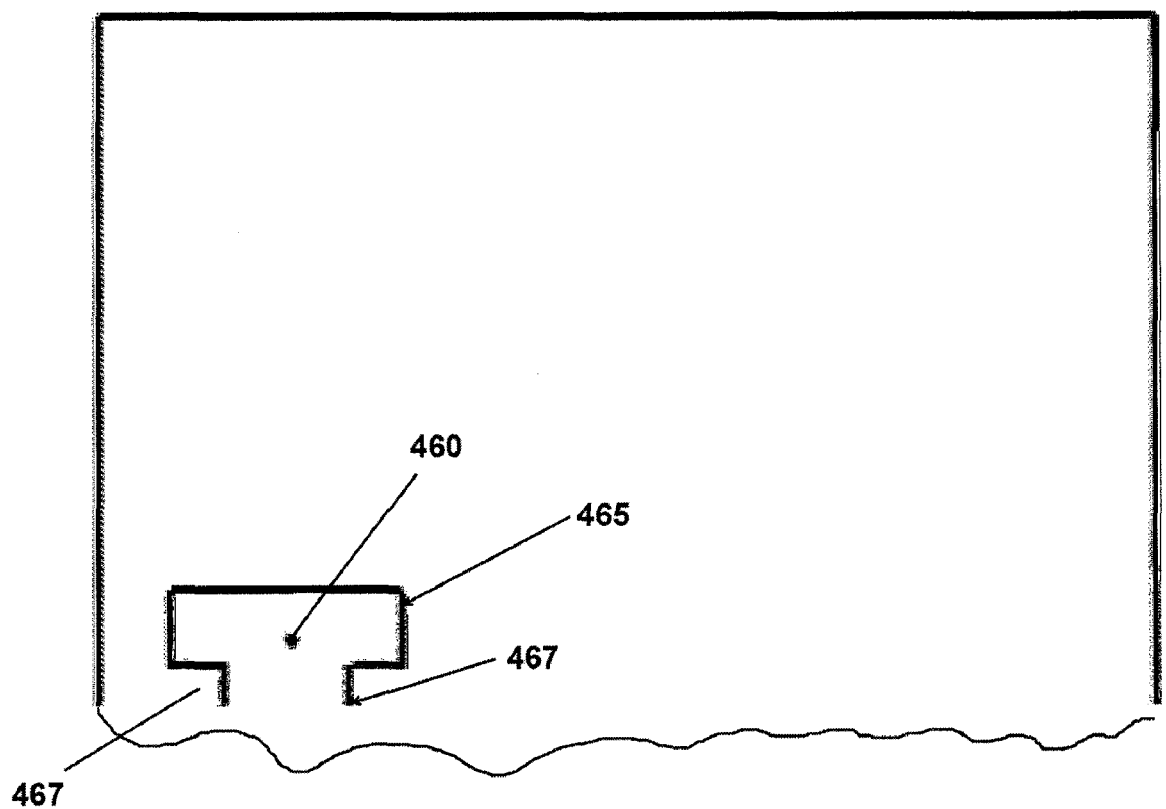
FIG. 9 is a side elevational view of detail 6 of FIG. 5 with the LED module removed therefrom.

As depicted in FIGS. 8 and 9, interior 460 may have a groove 465 which may receive LED module 200 having a plurality of LEDs 210 attached thereto. Groove 465 may be configured (e.g., shaped and dimensioned) to receive LED module 200 therein such that LED module 200 may be slid out of interior 460 through door 450 when door 450 is an open position. Groove 465 may be defined by retaining portions 467 which extend toward one another and inhibit movement of an LED module (e.g., LED module 200) in a direction inwardly toward secondary optic 300 while allowing movement laterally into and out of groove 465. For example, LED module 200 may be replaced with a another LED module through door 450 when LED module 200 has degraded and its capacity for providing light has diminished.

Figure 7:
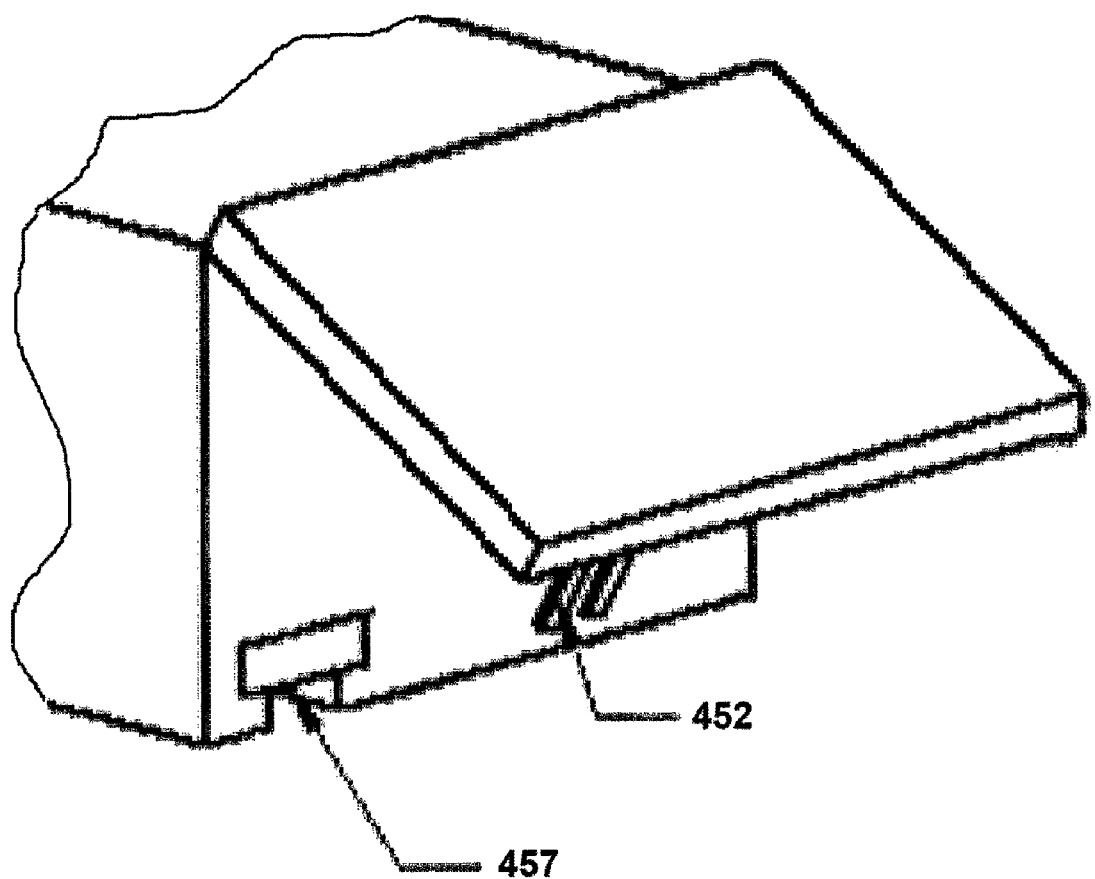
FIG. 7 is another perspective view of detail 6 of FIG. 5.

As depicted in FIGS. 7-9, door 450 may include prongs or electrical connectors 452 configured to cause electric connection between a source of electrical current and LEDs 210 of LED module 200. For example, connectors 452 may be connected to a source of electrical current and an electrical connection may occur when door 450 is in a closed position and connectors 452 contact connectors (e.g., an anode and diode) 455 (FIGS. 4, 7-9) of LED module 200 in connector slot 457.

As depicted in FIG. 4 and described above, each side of frame 400 may receive an LED module (e.g., LED module 200) with LEDs (e.g., LEDs 210) directed inwardly. Accordingly, each side of frame 400 may include a door, such as door 450, to allow the LED modules utilized in frame 400 to be removable and replaceable. Thus, system 10 may be energized by electrical current, and therefore operate, only when all the doors (e.g., door 450) on the sides of frame 400 are in a closed position. Further, each side may include a groove, such as groove 465, for receiving the LED modules.

The replaceability of the LED modules via the grooves and doors allows system 10 to be upgraded as the LEDs (e.g., LEDs 210) degrade over time or when it is desired to substitute existing LED modules for brighter, more efficient, brighter or otherwise desirable (e.g., change in color) substitute LED modules, for example, as technology advances.

Figure 10:
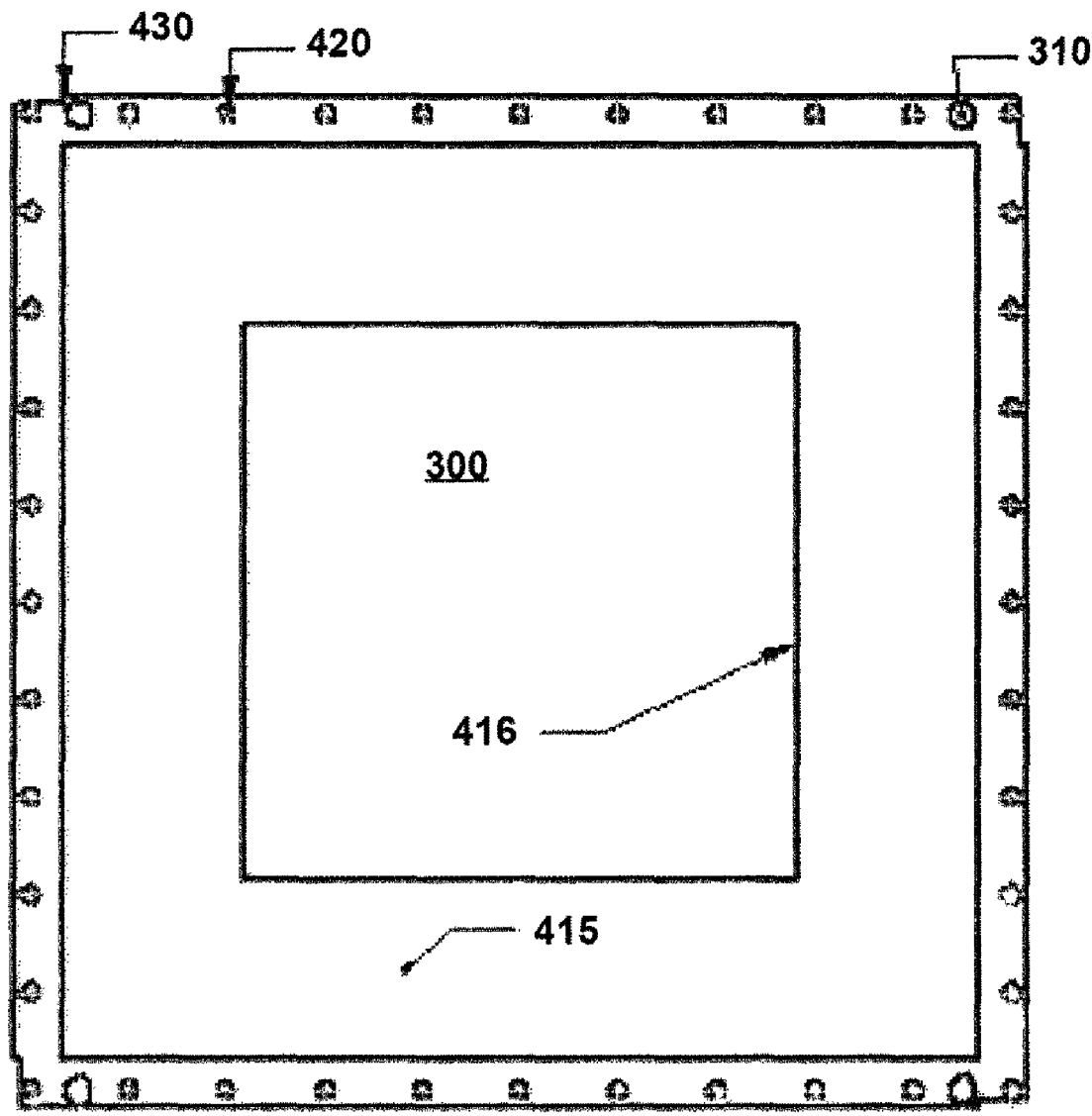
FIG. 10 is a front elevational view of the system of FIG. 1.
Figure 11:
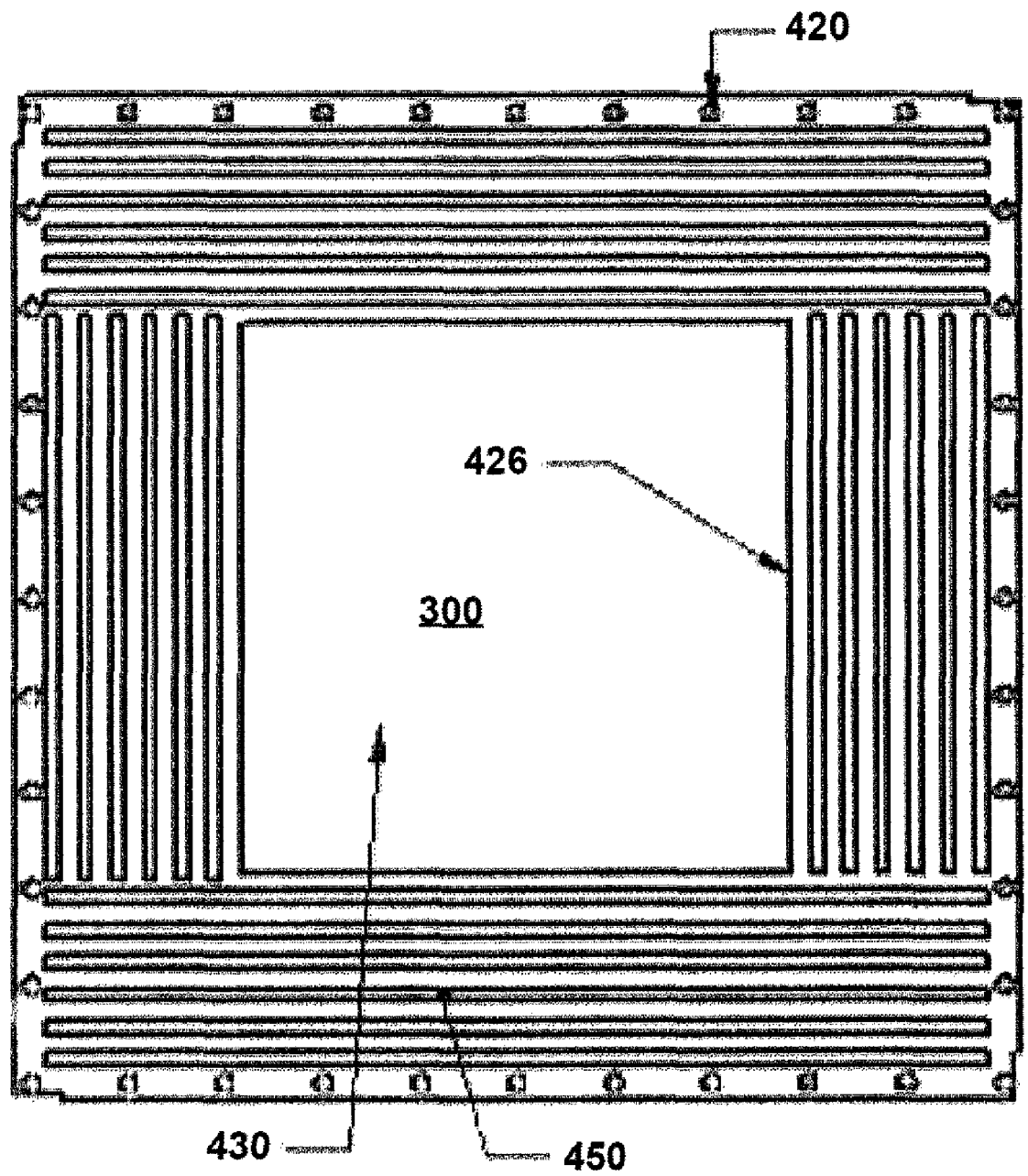
FIG. 11 is a rear elevational view of the system of FIG. 1.
Figure 15:
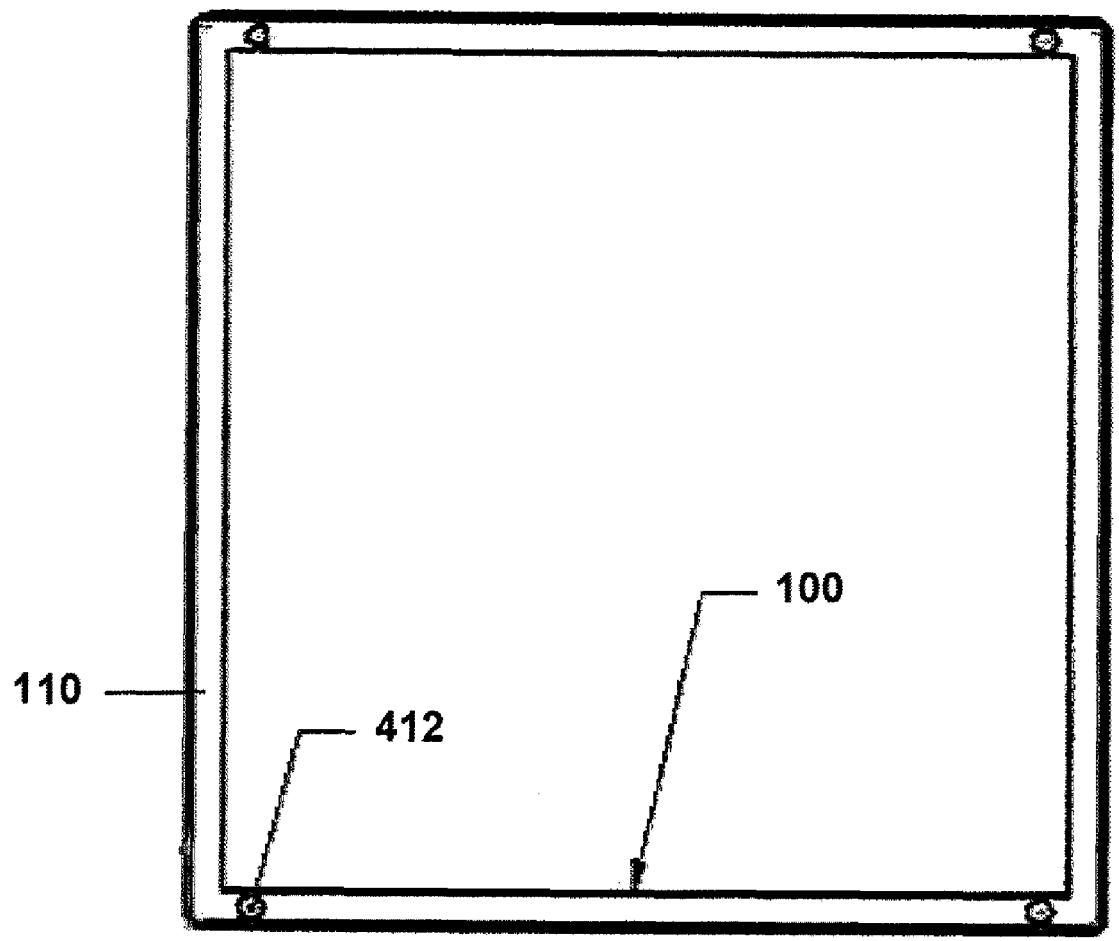
FIG. 15 is a front elevational view of the covering portion of the system of FIG. 1.
Figure 16:
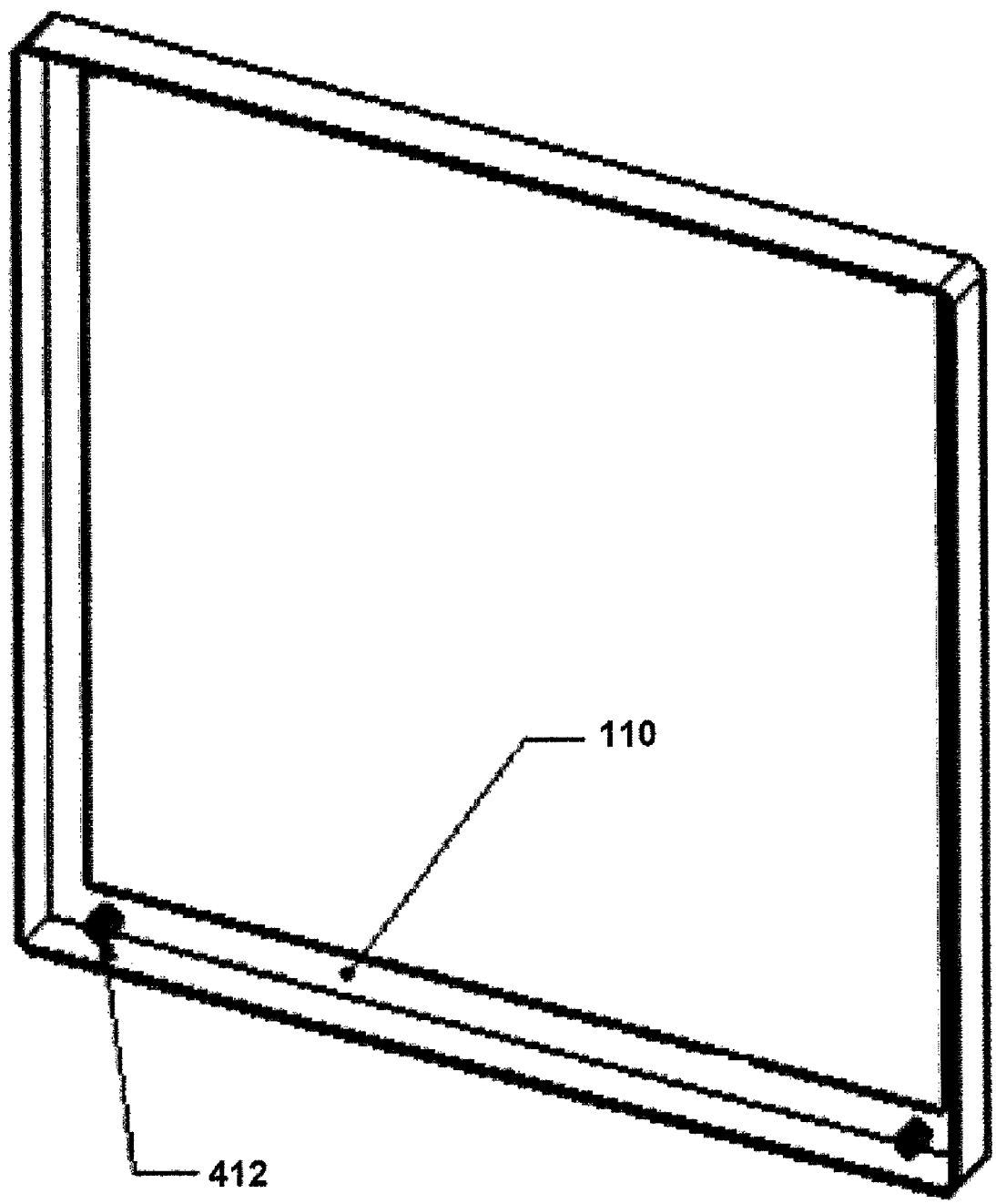
FIG. 16 is a rear perspective view of the covering portion of FIG. 1.

As depicted in FIGS. 10 and 11, frame 400 may include front surface 415 and back surface 425. Inner ends 416 of front surface 415 may define or bound primary lighting opening 410 while inner ends 426 of back surface 425 may define or bound secondary lighting opening 430. Back surface 425 may also include a plurality of heat exchange fins 450 (FIG. 15) which provide a heat sink to ensure that the LEDs (e.g., LEDs 210) do not overheat. In particular, the fins conduct heat from the LED modules and LEDs through the connection of the LED fins to back surface 425 which are located on an opposite side of frame 400 relative to the LED modules and LEDs. The use of such a heat sink inhibits the degradation of the LEDs (e.g., LEDs 210) attached to the LED modules (e.g., LED module 200).

Figure 12:
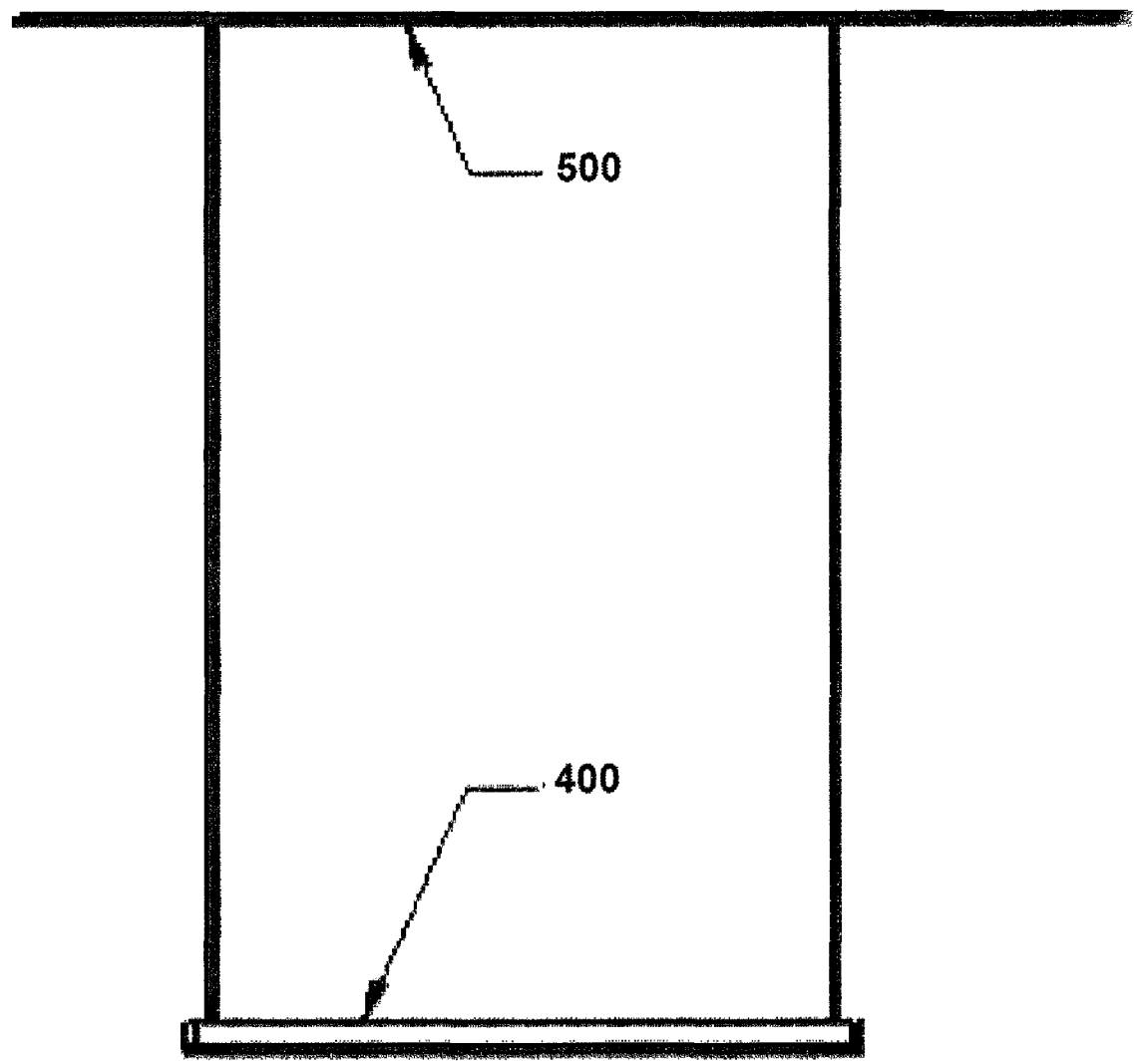
FIG. 12 is a side elevational view in simplified form of the system of FIG. 1 suspended from a ceiling.
Figure 13:
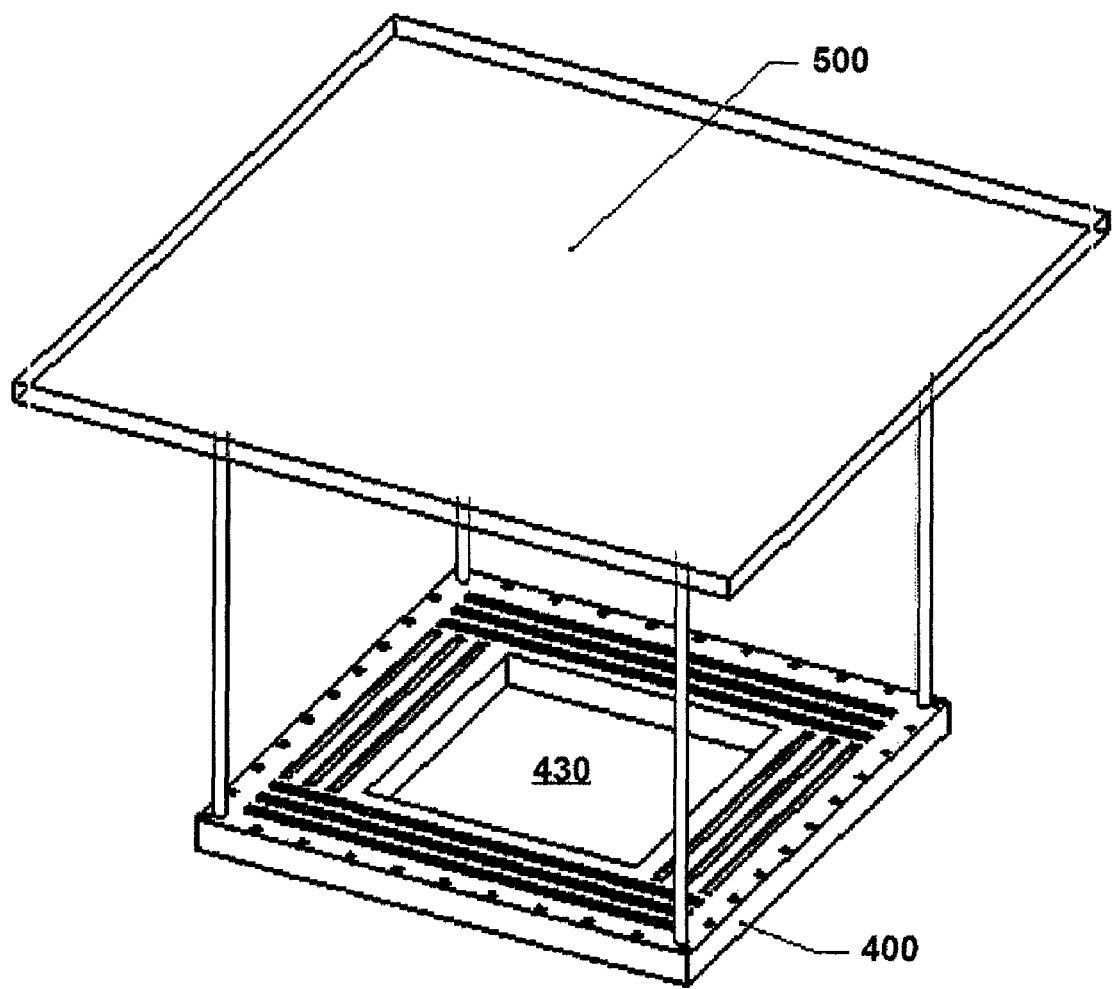
FIG. 13 is a perspective view of the system of FIG. 12.

As depicted in FIGS. 12 and 13, frame 400 may be suspended from a ceiling portion 500 via a supporting member such as a chain, cord or other structure for supporting frame 400 suspended from such a ceiling. Secondary opening 430 allows light to project from secondary optic 300 therethrough to provide lighting toward ceiling portion 500 thereby providing indirect lighting to a room or space. The use of such indirect lighting alleviates a "cave effect" which may be caused by a suspended light fixture which direct light downwardly but leaves a relatively darkened area above the light fixture.

Figure 14:
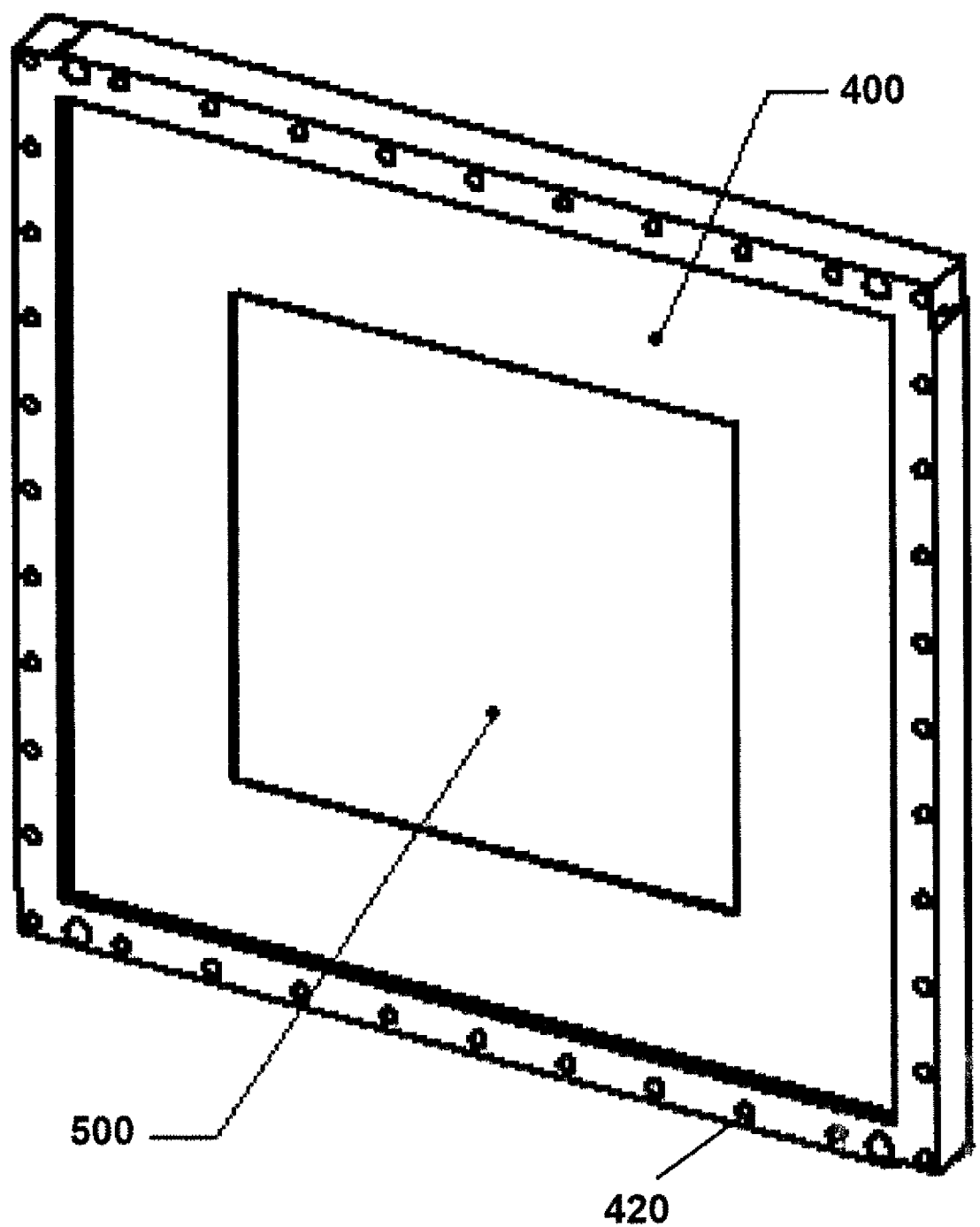
FIG. 14 is a rear perspective view of the system of FIG. 1 having a cover engaging the system to cover a secondary opening.

As depicted in FIG. 14, system 10 may include covering portion 500 releasably connectable to back surface 425 such that a user may utilize system 10 suspended as depicted in FIGS. 12 and 13 or flush mounted to a ceiling portion, such as ceiling portion 500. In this way, a light fixture, such as system 10, may be supplied to a consumer as a kit and the consumer may determine whether to flush mount or suspend the light fixture. In the suspended option, indirect lighting may be supplied through opening 430 when covering portion 500 is not engaged with frame 400.

Returning to FIGS. 10, 11, 12, 13, 15 and 16, frame 400 may include mounting holes 420 extending therethrough from front surface 415 to back surface 425 to facilitate flush mounting of frame 400 to a ceiling or other supporting structure. Multiple mounting holes 420 may be placed along a perimeter of frame 400 to facilitate mounting via a screw, nail or other fastener at a convenient point relative to a supporting structure. After frame 400 has been mounted to such supporting structure, covering portion 100 may be connected to frame 400 to hide mounting holes 420. For example, covering portion 100 may include projecting portions 412 extending from a back surface 110 of covering portion 100 and configured (e.g., shaped and dimension) to be received in holes 310 such as containing PEM® brand fasteners to connect covering portion 100 to frame 400 thereby hiding mounting holes 420. For example, projecting portions 412 and/or holes 310 such as containing PEM® brand fasteners may be formed of a material which is a elastically deformable such that the projecting portions may be deformed radially inwardly as they are received in the holes and the projection portions may rebound to provide a frictional fit holding covering portion 100 on frame 400. Further, covering portion 100 may be releasably connectable to frame 400 such that the covering portion may be removed to allow access to fasteners connecting frame 400 through mounting holes 420 after frame 400 has been connected to a supporting structure. Moreover, covering portion 100 may be formed in any number of decorative designs, colors or materials (e.g., wood, glass, plastic, etc.), such that a covering portion may be replaced by a different colored or designed covering portion as desired by a user. Further, covering portion 100 may be formed as one monolithic integral piece or may be formed in multiple pieces attachable to frame 400.

Figure 17:
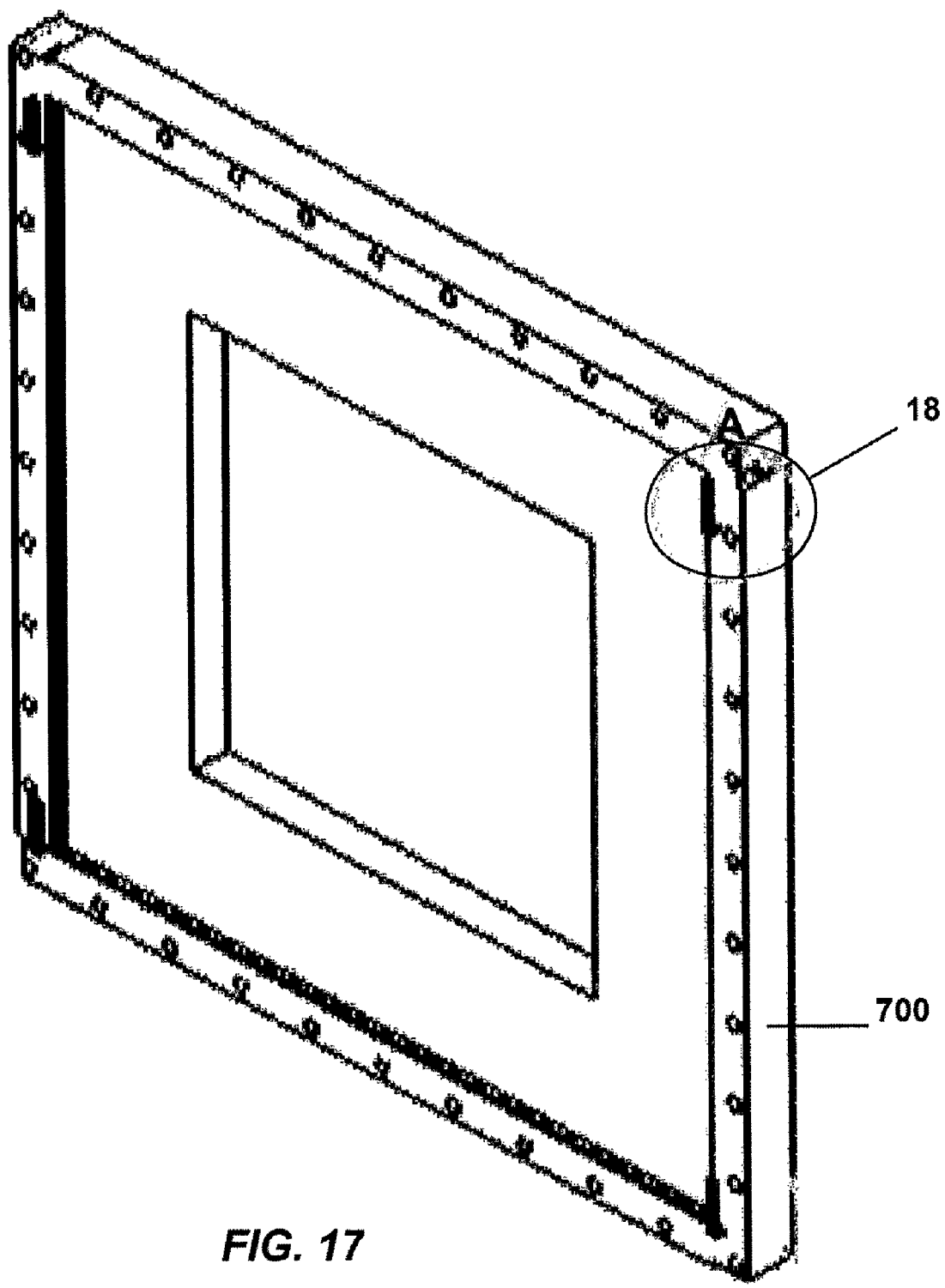
FIG. 17 is a front perspective view of an LED light fixture system having grooves for receiving covering portions in accordance with the present invention.
Figure 18:
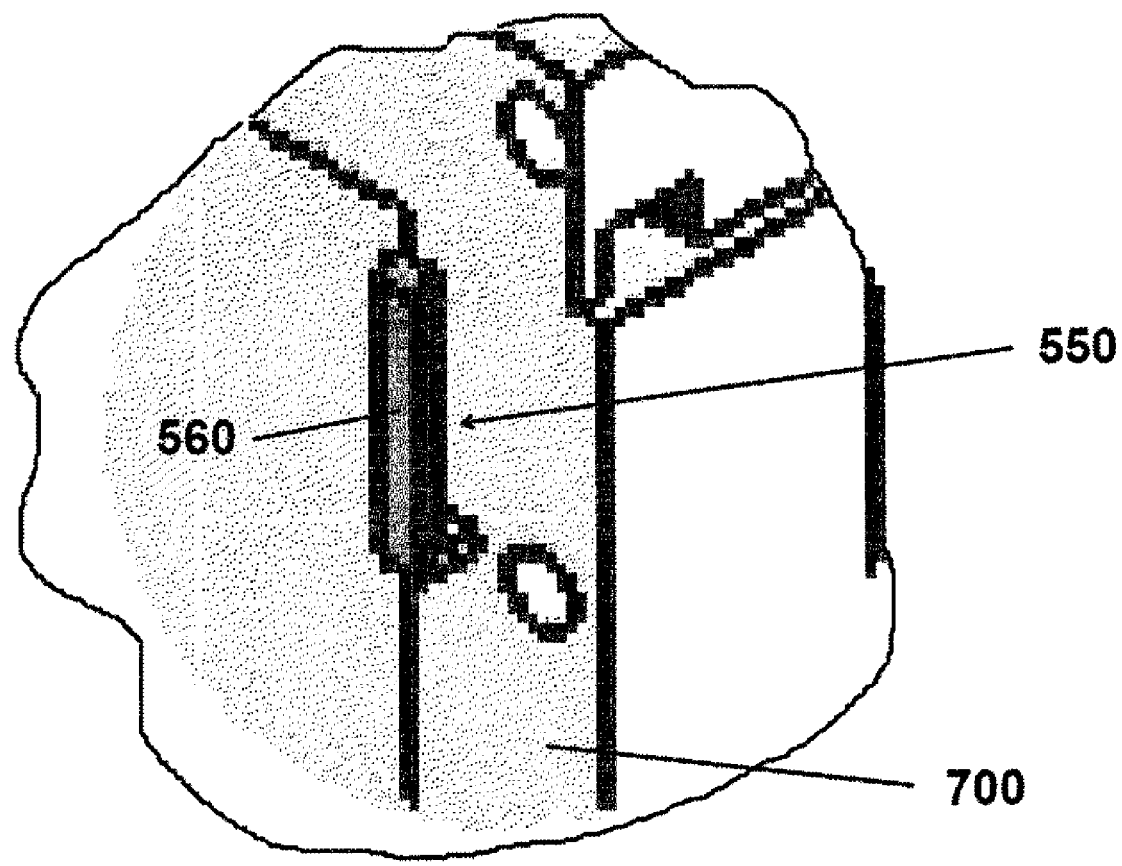
FIG. 18 is a perspective view of a portion of FIG. 17 showing a groove and retaining member for a covering portion.
Figure 19:
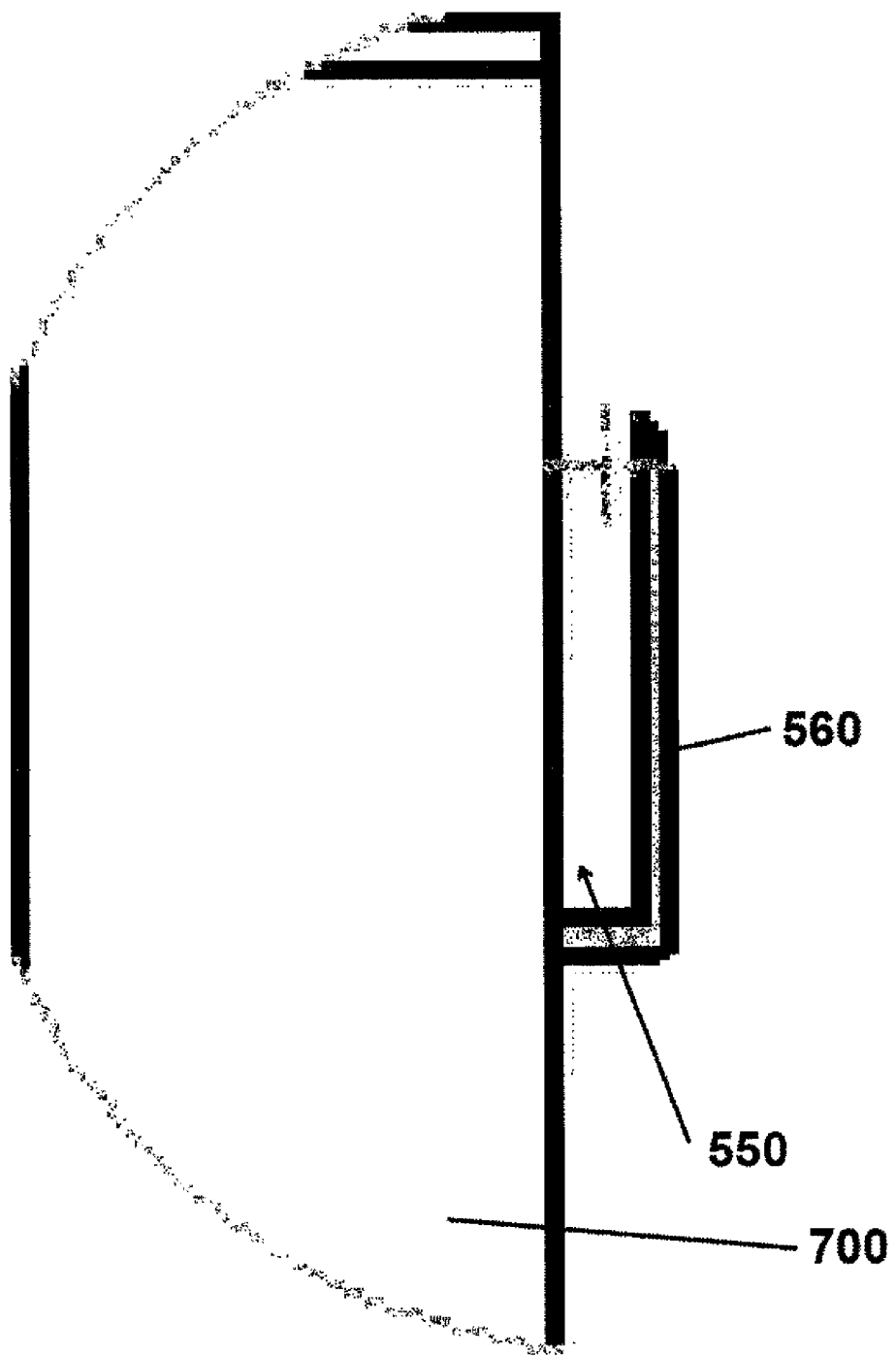
FIG. 19 is a side elevational view of the portion of FIG. 17 depicted in FIG. 18.

In another example depicted in FIGS. 17, 18 and 19, one or more covering portions 500 may be received in one or more grooves 550 formed by holding portions 560 extending outwardly (e.g., in a L shape) from an outer surface of frame 700 and configured (e.g., shaped and dimensioned) to connect such covering portions to the frame instead of connecting via projections and holes as described above. Such covering portions may have extension portions which are received in the groove, or the entirety thereof may be received therein, to releasably connect the one or more covering portions to the frame. As described above, the covering portions are configured to cover mounting holes of the frame when connected thereto.

Figure 20:
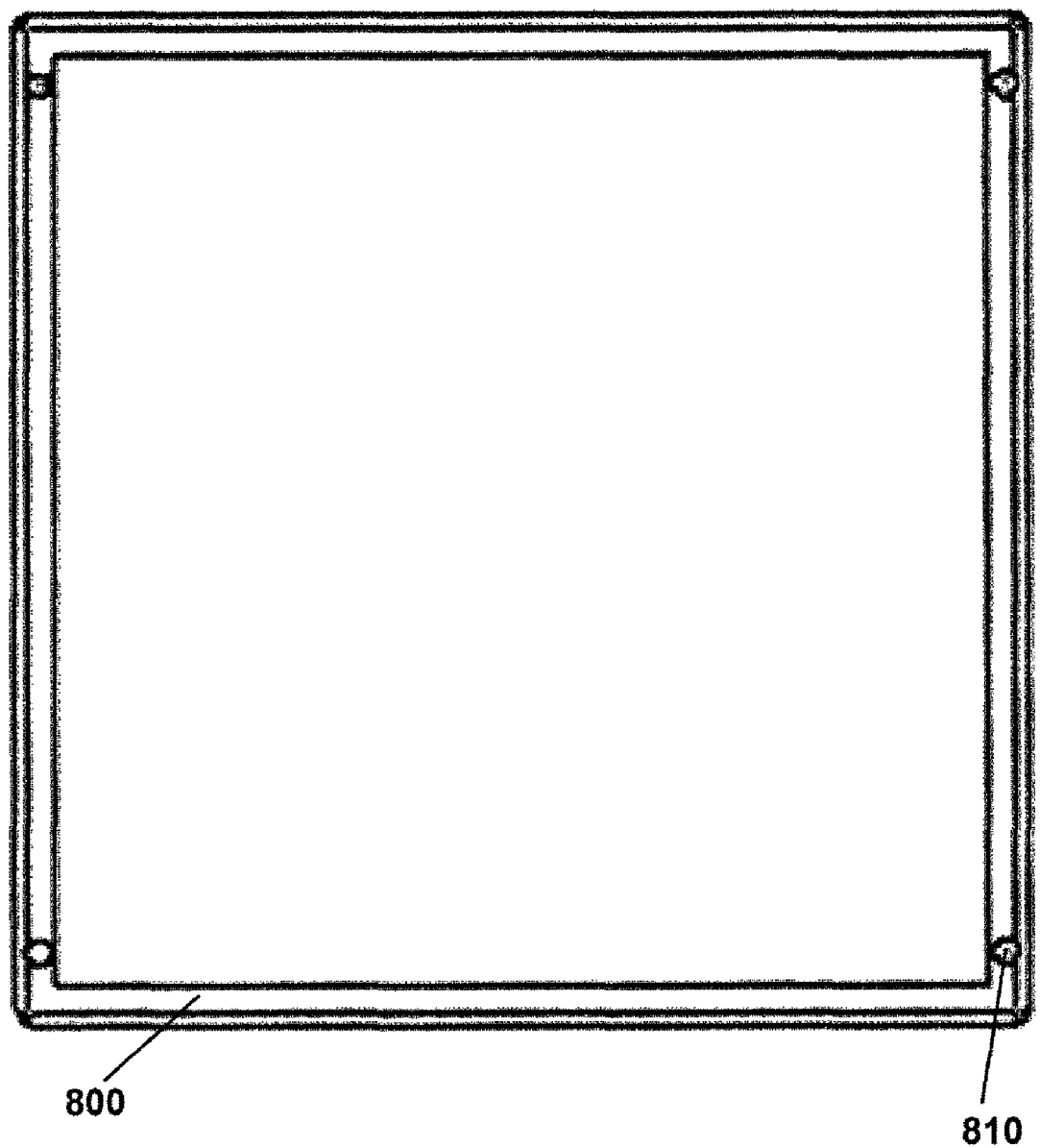
FIG. 20 is a front elevational view of an LED light fixture system in accordance with the present invention.
Figure 21:
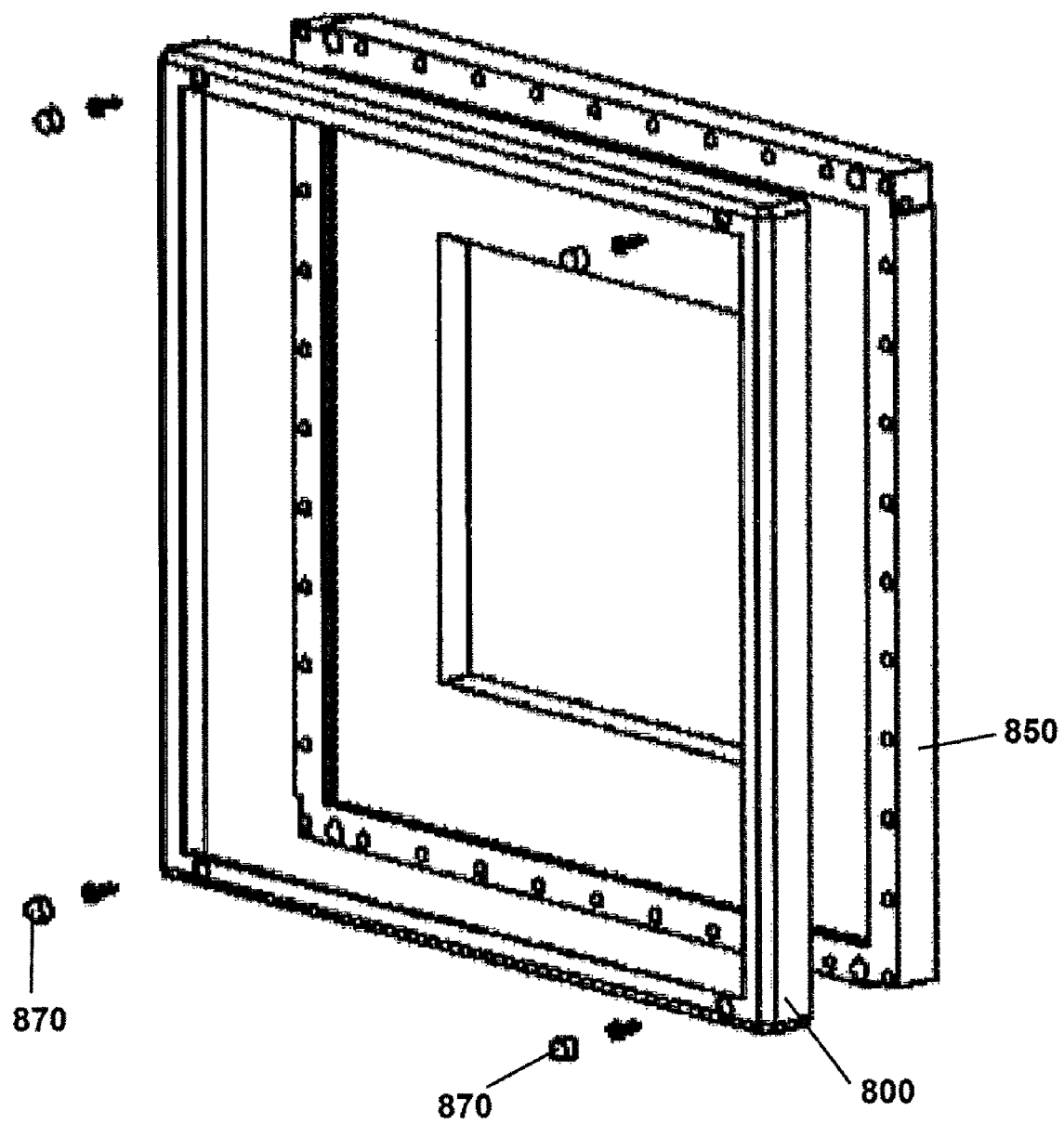
FIG. 21 is an exploded perspective view of the system of FIG. 20 showing a covering portion connectable to a frame.

In a further example, one or more covering portions (e.g., covering portion 800) may include one or more holes 810 configured to receive a fastener (e.g., screws, nails, etc.) to connect the covering portion to a frame 850 as depicted in FIGS. 20 and 21. The holes may then be filled in by plugs 870 having a size slightly larger than the holes receiving the fasteners such that the plugs may be held therein to cover the fastener holes by a frictional fit. Alternatively, the plugs may be held therein in any other manner such as via glue, adhesive or welding. Such plugs may also be removable to allow access to an interior of frame 850, for example.

It will be understood to one of ordinary skill in the art that although the frames (e.g., frame 400) described and depicted herein are formed in a square shape, different shapes could be used for the lighting fixture systems (e.g., light fixture system 10) in accordance with the present invention. Further, the LED modules could be formed in multiple shapes to allow the lighting fixtures to be formed in such various shapes. Also, any number of LED modules of various sizes and number of LEDs may be utilized to form such shapes.

Also, the internal environment (e.g., interior 460) of the LED panel fixture may be monitored via various sensors such as to measure temperature and the amount of electrical current used. The results of such sensors may be analyzed relative to the carbon footprint of the fixture and money saved relative to standard lighting.

Further, the LED modules may be energized and controlled by a driver. The driver may be located adjacent system 10 (e.g. in a ceiling portion nearby) and the driver may be controllable by a standard potentiometer, for example. In a further example, such a driver could be incorporated into an interior of a frame (e.g., frame 400) of an LED light fixture system (e.g., LED light fixture system 10).

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

The invention claimed is:

1. An LED pendant light fixture comprising:
a plurality of LEDs attached to a peripheral frame and positioned to direct light substantially in a first direction from said frame inwardly toward a secondary optic;
a supporting member connectable to said frame and mountable to horizontally support said frame with a primarily opening facing downwardly and a secondary opening facing upwardly;
said primary opening bounded by outside surfaces of a front side of said frame and located in a second direction substantially orthogonal to said first direction relative to said secondary optic to provide direct lighting from said secondary optic through said primary opening toward an area below said frame when said frame is suspended from said supporting member; and
said secondary opening opposite said primary opening on said frame and located in a third direction substantially orthogonal to said first direction relative to said secondary optic to provide indirect lighting from said secondary optic through said secondary opening toward an area above said frame when said frame is suspended from said supporting member.

2. The fixture of claim 1 further comprising a releasably attachable portion connectable to said frame and dimensioned to cover said secondary opening when said releasably attachable portion is connected to said frame.

3. The fixture of claim 1 wherein said supporting member is operable to suspend said frame horizontally from a ceiling.

4. The fixture of claim 1 wherein said secondary optic is operable to soften light produced from said LED module.

5. The fixture of claim 1 wherein said frame comprises fins extending away from a back side of said frame to provide a heat sink for cooling of the LEDs.

6. The fixture of claim 1 wherein said frame comprises an opening positioned to allow said plurality of LEDs to be inserted or removed through said opening in said frame.

7. The fixture of claim 1 wherein said frame comprises an openable portion positioned to allow said plurality of LEDs to be inserted or removed through an opening created in said frame when said openable portion is in an open position.

8. The fixture of claim 1 wherein said frame comprises an electrical connection between said plurality of LEDs and a source of electrical current.

9. The fixture of claim 1 wherein said frame comprises an opening positioned to allow said plurality of LEDs to be inserted or removed through said opening in said frame, and said frame comprises an electrical connection between said plurality of LEDs and a source of electrical current when said plurality of LEDs is inserted in said opening and disposed in said frame.

10. The fixture of claim 1 wherein said frame comprises an openable portion comprising electrical connectors which engage secondary electrical connectors of said plurality of LEDs when said openable portion is in a closed position.

11. The fixture of claim 1 wherein said plurality of LEDs comprises an LED module.

12. The fixture of claim 1 wherein said plurality of LEDs comprises an LED module removably receivable in a groove of said peripheral frame.

13. The system of claim 1 wherein said plurality of LEDs comprises a plurality of LED modules releasably attached to interior surfaces of said peripheral frame and directed inwardly.

14. The fixture of claim 1 wherein said frame comprises a plurality of mounting holes to allow said frame to be mounted to the supporting member, and a decorative cover releasably attachable to said frame to cover said mounting holes.

15. The fixture of claim 14 wherein said cover comprises a plurality of projections configured to be received in a plurality of holes of said frame to attach said cover to said frame.

16. The fixture of claim 15 wherein said plurality of projections is elastically deformable to allow said projections to be received within said holes to provide a friction fit between said projections and said holes.

17. The fixture of claim 14 wherein said frame comprises a retaining member forming a groove configured to receive said cover.

18. The fixture of claim 14 wherein said cover comprises at least one connecting hole receiving a fastener connecting said cover to said frame and wherein said connecting hole receives a plug for covering said connecting hole.

19. The system of claim 1 wherein said peripheral frame encloses said plurality of LEDs.

\* \* \* \* \*

UNITED STATES PATENT AND TRADEMARK OFFICE
CERTIFICATE OF CORRECTION

| | | |
|---|---|---|
| PATENT NO. | : 7,914,193 B2 | Page 1 of 1 |
| APPLICATION NO. | : 12/795149 | |
| DATED | : March 29, 2011 | |
| INVENTOR(S) | : Peifer et al. | |

It is certified that error appears in the above-identified patent and that said Letters Patent is hereby corrected as shown below:

In Claim 1, at Column 6, Line 38: Delete "primarily" and insert --primary--

Signed and Sealed this
Thirty-first Day of May, 2011

David J. Kappos
*Director of the United States Patent and Trademark Office*